United States Patent [19]
Meade

[11] 3,807,518
[45] Apr. 30, 1974

[54] SYSTEM FOR WEIGHING FIELD EVENT IMPLEMENTS

[76] Inventor: George E. Meade, 12547 Califa St., North Hollywood, Calif. 91607

[22] Filed: Apr. 30, 1973

[21] Appl. No.: 355,646

[52] U.S. Cl................ 177/252, 177/171, 177/176, 177/191, 177/235, 177/246, 177/250, 177/262
[51] Int. Cl........................... G01g 1/36, G01g 1/18
[58] Field of Search........................... 177/171–172, 177/176, 191, 197, 235, 246–252, 262

[56] References Cited
UNITED STATES PATENTS

| | | | |
|---|---|---|---|
| 2,695,166 | 11/1954 | Morgan | 177/247 X |
| 1,988,655 | 1/1935 | Hamblin | 177/157 |
| 1,949,721 | 3/1934 | Kropsieg | 177/252 X |
| 1,527,788 | 2/1925 | McDivine | 177/251 X |
| 1,428,551 | 9/1932 | Magrady | 177/250 |

Primary Examiner—Stephen J. Tomsky
Assistant Examiner—Vit W. Miska
Attorney, Agent, or Firm—Lyon & Lyon

[57] ABSTRACT

A system used with a balance for verifying the weight of field event implements. The system includes a biasing weight for balancing the standard weight of the lightest class of field event implements to be verified by the system. Two balancing weights equal in total weight to the standard weight of the lightest class of field event implements are used to balance two heavier classes of field event implements. The system allows an initial calibration and adjustment of the unit which need not be repeated during the meet even though the weights of a variety of field event implements are verified thereon. A weight support device is also provided on the balance for accommodating specific field event implements. More weights may also be employed to measure more than the three initially specified classes of field event implements.

14 Claims, 6 Drawing Figures

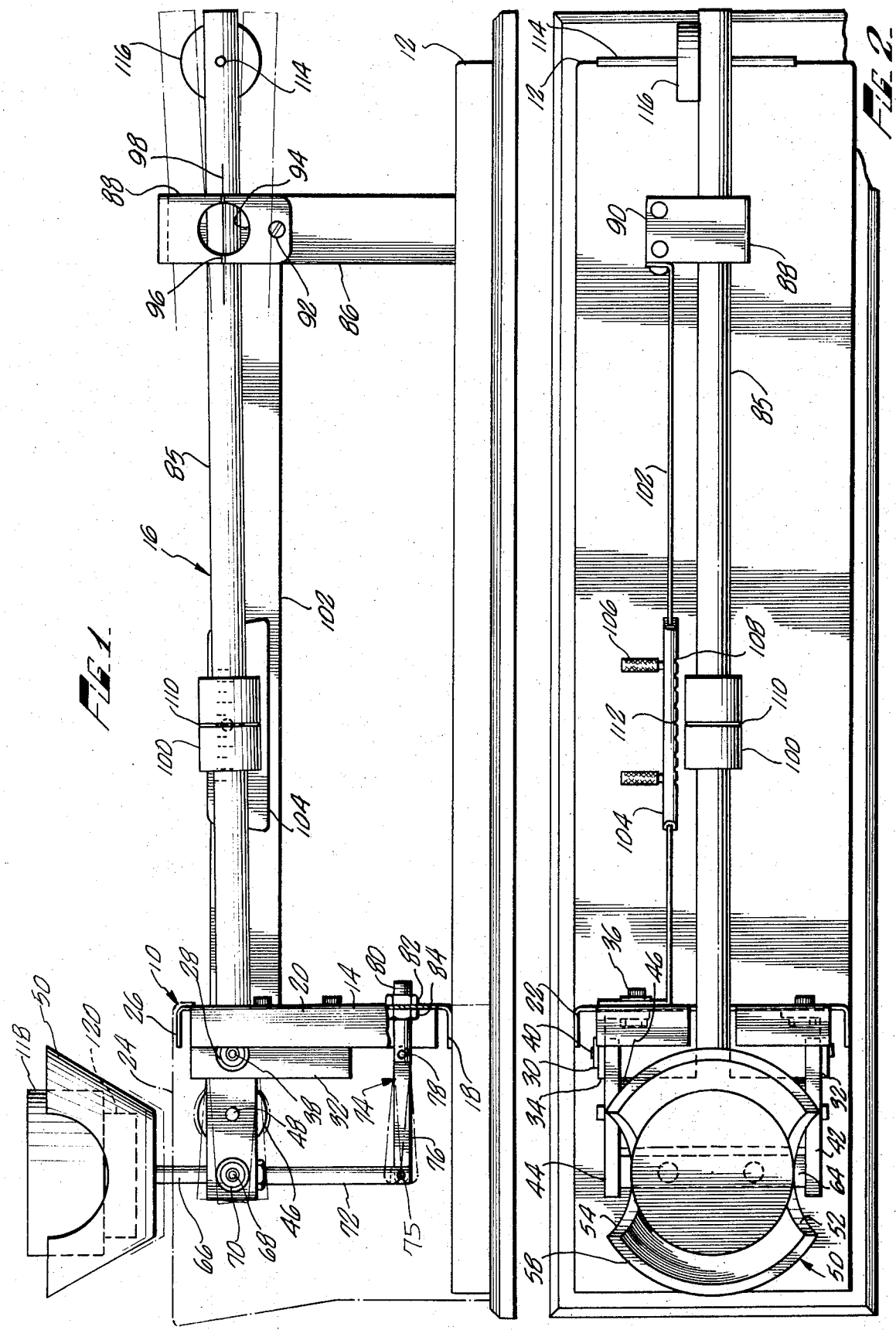

SYSTEM FOR WEIGHING FIELD EVENT IMPLEMENTS

Field event implements used in official competition in the United States and other countries must conform to specific, rigid weight standards in order to qualify for nationally and internationally recognized records. It is generally required these implements be verified at each meet before a record can be recognized. Of the classes of field event implements commonly recognized in track and field competition, the most commonly used are the javelin, the discus and the shot. Each class has a specific weight standard which must be closely followed. These implements must be weighed at each meet for official acceptance of any records made therewith. To measure the weights of these various implements, a conventional balance is normally employed. In the United States, this balance must be approved by the United States Bureau of Weights and Measures and by the Amateur Athletic Union of the United States.

Conventional balances and scales normally employed have been general purpose weighing devices and have not been specifically designed for field event implements. Consequently, an excessive number of weights is normally employed with each balance used. Further, because of the range in weight between the various implements, frequent adjustment and calibration is often necessary. Consequently, a substantial amount of time is normally expended during a meet for the measurement of these implements. Moreover, repeated tampering of the weighing devices provides more chance for error. A system which reduces the expenditure of time needed for the weighing of such implements and reduces the chance of error due to repeated adjustments would be of benefit for use in official meets where substantial weight verifying procedures are required.

The present invention provides a system whereby a balance may be initially calibrated and set up for use throughout the meet. The balance may then operate to verify all of the various field event implements to be used in competition. Consequently, a substantial amount of time may be saved in calibration and setting up using the present device. Further, the single setting up of the balance prevents any significant chance of error. Moreover, the present invention incorporates a compact balancing device using a minimum number of weights to accurately measure the field event implements. This adds greatly to the convenience of the weighing system.

Accordingly, a first object of the present invention is to provide a system for use with a balance to specifically accommodate the weighing of field event implements.

A second object of the present invention is to provide a system employing a balance for verifying field event implements which require only one set up and calibration for each meet.

A third object of the present invention is to provide a system incorporating a balance which employs the same weights for both calibration and implement verification.

Another object of the present invention is to provide a system for verifying the weight of field event implements through simple, systematic procedures which do not require rebalancing of the weighing device.

A further object of the present invention is to provide a system which incorporates a biased balance device which can be calibrated and can be used for verifying the weights of three field event implements with two preselected weights.

Thus, a system is disclosed which uses a balance to verify the weights of field event implements that does not require successive adjustments and calibrations, which uses a minimum of balancing and calibrating weights and which provides simple procedures for weighing a range of field event implements.

Further objects and advantages of the present invention will become apparent from the following detailed description and accompanying drawings.

FIG. 1 is a front view of the balance system including weights positioned in the balance pan for calibration.

FIG. 2 is a top view of the balance system.

Figure 3:
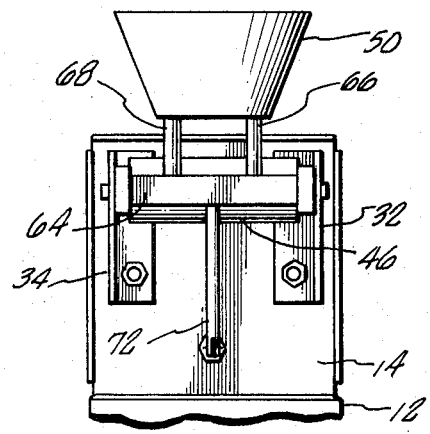
FIG. 3 is an end view of the balance system illustrated with the housing removed.

Turning specifically to the drawings, a balance, generally designated 10, is illustrated. The balance 10 consists of a base 12, a fulcrum support 14 and a balance arm assembly, generally designated 16. The base 12 is preferably of sufficient mass to promote stability of the entire unit. Further, the base should be rigid to prevent inaccuracies caused by the transporting of the apparatus. The fulcrum support 14 is, in this embodiment, formed from a single plate, also designated 14, which extends upward from the base 12 a convenient distance. The fulcrum plate 14 is rigidly attached to the base 12 at a flange 18. Two side members 20 and 22 are provided at the edges of the fulcrum plate 14 for rigidity and as a means for mating with and providing a seal with a housing 24 which is shown in phantom in FIG. 1. A top flange 26 is also provided along the upper edge of the fulcrum plate 14. This flange 26 cooperates with the housing 24 for convenient mating of the housing 24 on the balance 10.

A fulcrum is provided at the centerline extending through two bearings 28 and 30. The bearings 28 and 30 are selected to provide low frictional resistance and require little or no lubrication to insure the overall accuracy of the unit. The bearings 28 and 30 are positioned within bearing supports 32 and 34. These supports 32 and 34 may be simple angle members extending vertically within the unit. The bearings 28 and 30 are snugly fit into holes located through these angle members 32 and 34. Fasteners 36 are employed to fasten the bearing supports 32 and 34 to the fulcrum plate 14. Two such fasteners 36 are employed with each member 32 and 34 to insure that the angle members will remain where placed. Shafts 38 and 40 extend through bearings 28 and 30 where they are constrained to rotate in fixed positions coincident with the centerlines of the bearings 28 and 30. The shafts 38 and 40 are rigidly fixed in arms 42 and 44. Arms 42 and 44 are constrained thereby to rotate about the centerlines of the bearings 28 and 30 with shafts 38 and 40. In this manner, the fulcrum support 14 is pivotally connected to the balancing arm assembly.

Arms 42 and 44 extend from the bearings 28 and 30 toward the implement receiving end of the balance assembly. A cross member 46 extends between arms 42 and 44 to one side of the bearings 28 and 30. In this one embodiment, this cross member 46 is employed to establish lateral spacing of the arms 42 and 44 to keep the shafts 38 and 40 in the bearings 28 and 30, to insure mutually parallel orientation of the arms 42 and 44, and to provide a weight cooperating with the mass located on the other side of the bearings 28 and 30 to balance the apparatus. Fasteners 48 may be employed to rigidly hold arms 42 and 44 against the cross member 46.

Figure 4:
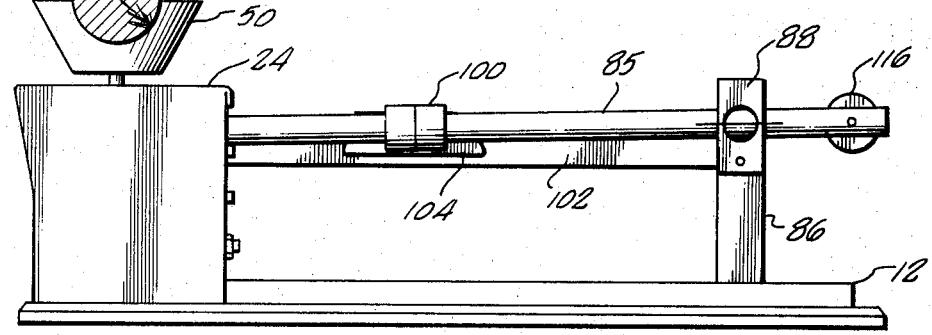
FIG. 4 is a less detailed front view showing the balance system arranged for a javelin.
Figure 5:
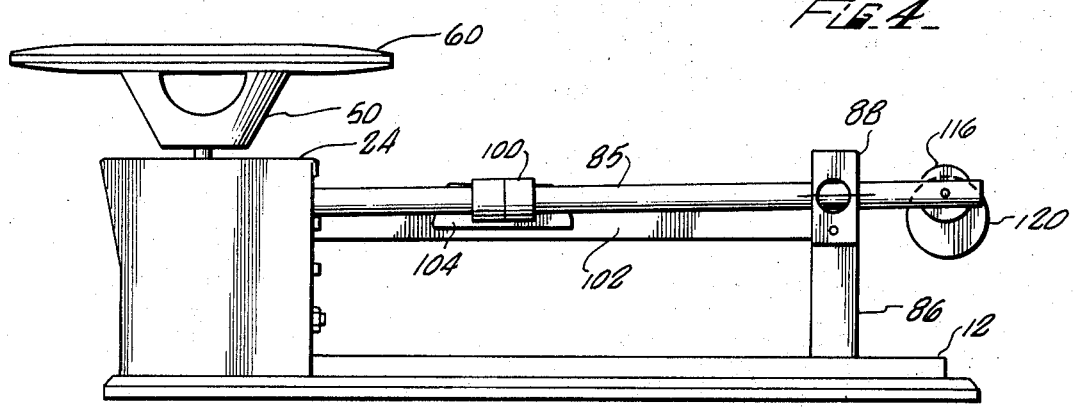
FIG. 5 is a less detailed front view showing the balance system arranged for a discus.
Figure 6:
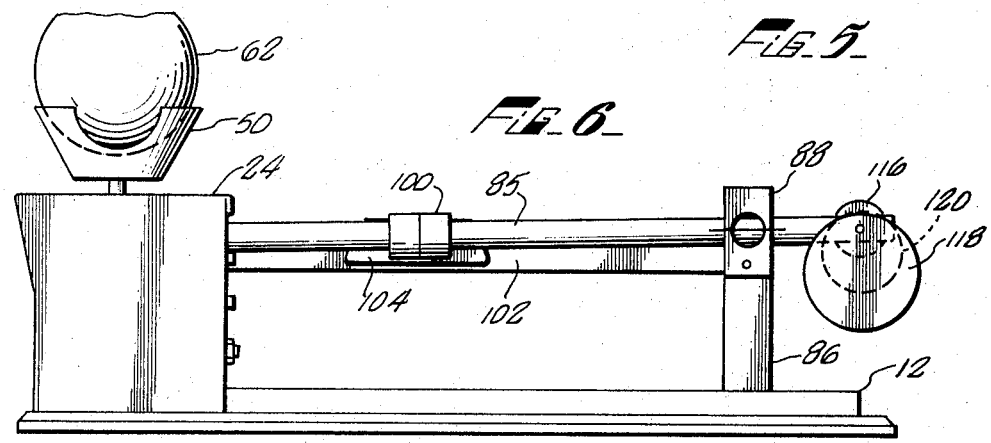
FIG. 6 is a less detailed front view of the balance system arranged for a shot.

An implement receiving means is provided for conveniently holding the various field event implements to be measured. Such a means is provided in this embodiment by an implement receiving pan 50. The implement receiving pan 50 has a truncated conical shape for convenience and ease of manufacture. The pan 50 is cupped and has a flat upper surface to receive the various weights and implements. Two circular notches 52 and 54 are cut through the walls of the pan 50 for receipt of a javelin 56 as best seen in FIG. 4. The top surface 58 is preferably flat for receipt of a discus 60 as illustrated in FIG. 5. The cupped interior of the pan 50 also accommodates a shot 62 as illustrated in FIG. 6. Further, the balancing and calibration weights may be positioned in pan 50 as shown in FIG. 1. It also should be noted that the pan 50 is capable of receiving the various implements and weights so that the centers of gravity thereof will be located directly over the pan. This prevents instability of the balance implements and does not induce unbalanced forces aginst the balancing mechanism.

The implement receiving pan 50 is supported above a block 64 on extensions 66 and 68. Extensions 66 and 68 may conveniently comprise fasteners positioned through the bottom of the implement receiving pan 50 and threaded into the block 64. Spacers may be employed about the fasteners to retain the desired distance between the bottom of the pan 50 and the top of the block 64. The block 64 is also pivotally mounted into arms 42 and 44 by a shaft 68 positioned in bearings 70. The bearings 70 may also be press fit into holes located in the arms 42 and 44. To retain the implement receiving pan 50 vertically above the block 64, control rod 72 extends vertically downward from block 64 to pivotally receive an adjustable link 74. The control rod 72 and the adjustable link 74 may be conveniently pinned by means of a clevis end on the control rod 72 which fits over the end of the adjustable link 74. A pin may be positioned through both the rod 72 and the link 74 to provide the proper pivotal restraint at pivot point 75. The adjustable link 14 extends laterally to the fulcrum plate 14. The adjustable link 74 is comprised of a first member 76 extending from the control rod 72 to a pivot point 78 and a second member 80 which is pivotally joined with the first member 76 and extends to rigidly engage the fulcrum plate 14. The second member 80 may be threaded along a substantial portion of its length to receive locking nuts 82 and 84. In this manner, the adjustable link 74 may be easily adjusted along the longitudinal axis of the link. The control rod and adjustable link arrangement is provided to retain the vertical orientation of the implement receiving pan 50. Consequently, it is advantageous to construct the apparatus so that the distance between the centerline of shaft 68 and the pivot point 75 is equal to the distance between the centerline of shafts 38 and 40 and the pivot point 78. Similarly the distance between the centerline of shaft 68 and the centerline of shafts 38 and 40 can be equal to the distance between the pivot point 75 and the pivot point 78. Such an arrangement will insure that the implement receiving pan 50 remains vertically oriented in spite of any rotation of the arms 42 and 44 about the fulcrum.

A balance arm 85 extends from the fulcrum a substantial distance in a direction opposite to that of the implement receiving pan 50. In the present embodiment, the balance arm 85 is attached to the cross member 46 in order that arms 42 and 44 and the balance arm 85 will move about the fulcrum as a single unit. A guard 86 extends upward from the base 12 near the outer end of the balance arm 85. The guard 86 is a rigid element which limits the travel of the balance arm 85 and also provides a reference line for convenient balancing of the arm 85 at a fixed position. The guard 86 includes a bracket 88 which is fastened to the guard post 86 by fasteners 90. The bracket 88 extends laterally above the balance arm 85 and then extends downwardly to a point below the maximum desired downward travel of the balance arm 85. By having the brackets 88 extend laterally above the balance arm 85, the travel of the balance arm 85 is limited by the interference of the bracket 88 with the balance arm 85. A fastener 92 extends from the bracket 88 to the guard post 86 below the balance arm 85 to similarly prevent excessive travel of the balance arm 85 in a downward direction. A hole 94 is provided through the guard bracket 88 at a position which will allow convenient viewing of the balance arm 85 where the balance arm 85 is roughly in a horizontal position. Scribe marks 96 are cut into the bracket 88 to cooperate with a scribe mark 98 positioned on the side of the balance arm 16. These several scribe marks 96 and 98 may be used to provide a fixed reference point for balancing the arm 85.

A final balancing weight 100 is slidably mounted on the balance arm 85. This final balancing weight 100 may be employed to determine the degree to which the field event implement varies from the established standard for that class of implements. A track 102 is provided behind the final balancing weight 100. The track is mounted at one end to the fulcrum plate 14 and at the other end to the guard post 86. A sliding scale 104 is slidably mounted to the track 102. Set screws 106 are threaded into the back side of the sliding scale 104 in order that the sliding scale 104 may be locked in a specific position behind the final balancing weight 100 at the time the balance is calibrated. The heads of the set screws 106 are conveniently knurled to allow manual purchase thereof. Scribe marks 108 are positioned on the front face of the sliding scale 104 to cooperate with a scribe mark 110 located on the sliding scale 104. A central scribe mark 112 may be detailed differently from the remainder of the scribe marks 108 to provide a calibrated zero position.

A balancing weight receiving means is positioned near the outer end of the balance arm 85. This balance weight receiving means comprises a bar 114 which conveniently receives the various balancing weights. The weights are provided with holes located therethrough for mounting on the balance weight receiving bar 114. Biasing means are provided with the present system which offset the standard weight of the lightest class of field event implements that is to be verified on the system. Such a biasing means may be provided by a biasing weight 116 which is positioned on the balance weight receiving bar 114. The biasing weight 116 may be locked onto the balance weight receiving bar by means of a radially positioned set screw. This biasing weight 116 may be positioned at any point along the balance arm 85 but must be of sufficient magnitude to balance the lightest contemplated field event implement at whatever position is selected. Alternately, the biasing means may be build directly into the balance assembly through control of the weights of the various components. However, such an integral biasing means would not provide the flexibility associated with the biasing weight 116. When the lightest class of field event implements to be measured by the system is changed, the biasing weight 116 may be changed to accommodate the changed standard. For instance, the biasing weight 116 would have to changed to accommodate women's field event implements where the lightest women's implement is lighter than the corresponding men's implement.

Two balancing weights 118 and 120 are also provided. The combined weight of the balancing weights 118 and 120 is equal to the standard for the lightest class of field event implements to be measured on the device. By making the total of the weights 118 and 120 equal to the lightest field event implement, the balance may be calibrated to a balance point which is biased to offset the standard weight of the lightest field event implement. In this manner, the balance is both calibrated and prepared for the lightest field event implement and, as will be seen below, is also calibrated for the standard weights of heavier classes of field event implements.

The two weights 118 and 120 may be specifically defined to provide biasing loads which can be used to offset heavier field event implements. As can be seen in FIG. 5, the measurement of the discus 60 may be accomplished by hanging the balance weight 120 from the balance weight receiving bar 114. To weigh the shot 62, the balance weight 118 is also hung from the balance weight receiving bar 114. Naturally, to achieve these balanced relationships, the balance weights 118 and 120 are specific weights calculated for the specific classes of field event implements which are to be verified. Further, the ratio of the effective moment arm distance between the shafts 38 and 40 to the effective moment arm distance between the shafts 38 and 40 and the balance weight receiving bar 114 is also determined by the standard weights for the field event implements to be used with the system. Further field event implements may be similarly verified by hanging other weights on the balance weight receiving bar 114.

By specifically establishing the appropriate weights and the critical distances from the fulcrum, at least three field event implements may be verified with reference to a precalibrated balance of the unit. To first calibrate the unit, balance weights 118 and 120 are positioned within the implement receiving pan 50. The final balance weight 100 is adjusted to align the scribe marks 96 and 98. The sliding scale 104 is then positioned behind the final balancing weight 100 so that the central scribe mark 112 is aligned with the scribe mark 110 on the final balancing weight 100. The above procedure thereby provides a fixed calibration point which may be used with all classes of field event implements that are contemplated by the weight system. The various weights may then be arranged as shown in FIGS. 4, 5 and 6 for weighing the various specified implements.

To set up such a system as disclosed above for specific standard weights for the various field event implements, the following procedure is suggested. The three standard weights for the specific field event implements are first obtained. The ratio of the critical balancing distances from the fulcrum and the various weights may then be determined from the following formulas:

$$R = W_1/(W_3 - W_1)$$
$$w_B = W_1^2/(W_3 - W_1)$$
$$w_1 = W_1(W_2 - W_1)/(W_3 - W_1)$$
$$w_2 = W_1[1 - (W_2 - W_1)/(W_3 - W_1)]$$

where $R$ = ration of effective moment arm distances from the fulcrum (distance to the pan over distance to the weight bar)
$w_B$ = biasing weight 116
$w_1$ = balancing weight 120
$w_2$ = balancing weight 118
$W_1$ = standard weight of lightest field event implement
$W_2$ = standard weight of medium weight field event implement
$W_3$ = standard weight of heaviest field event implement The ratio of the critical balancing distances from the fulcrum may be established by the selective placement of the balance weight receiving bar 114 on the balance arm 85. Where a plurality of different weight systems are to be employed with the same balance arrangement, several points may be established along the balance arm 85 for fixing the balance weight receiving bar 114. The weights 116, 118 and 120 may also then be obtained.

To further illustrate the present system, the specific values for men's field event implements are set forth below.

$W_1$ = 0.800 Kg (weight of javelin)
$W_2$ = 2.00 Kg (weight of discus)
$W_3$ = 7.257 Kg (weight of shot)
Using the above:
$R$ = 0.124
$w_B$ = 0.0991 Kg
$w_1$ = 0.14867 Kg
$w_2$ = 0.65133 Kg When more than three classes of such field event implements are to be verified, an additional balancing weight may be employed. Such a balancing weight could replace balancing weights 118 and 120 on the balance weight receiving bar 114. The value of such an additional weight may be calculated by the following formula:

$$w_3 = W_4 R - W_1^2/(W_3 - W_1)$$

where $w_3$ = new balancing weight
$W_4$ = weight of new implement

Thus, a system is provided for first calibrating a balance apparatus to a specific bias from which a plurality of field event implements may be verified without further calibration or rebalancing of the device. Simple weight combinations are employed to compensate for the range of weights of the various field event implements. These compensating weights may also be employed to calibrate the balancing unit. The system may also be flexibly designed to allow for changes in the field event implements which are to be verified by the balance.

While embodiments and applications of this invention have been shown and described, it would be apparent to those skilled in the art that many more modifications are possible without departing from the inventive concepts herein described. The invention, therefore, is not to be restricted except as is necessary by the prior art and by the spirit of the appended claims.

What is claimed is:

1. A device to be used with a balance for verifying the weight of field event implements, comprising
    means located on a first side of the balance for receiving field event implements;
    a first weight;
    a second weight, the total of said first weight and said second weight being equal to the weight of the lightest class of field event implements with which the system is to be employed;
    biasing means for biasing the balance so that a balance is reached with said first weight and said second weight on said implement receiving means;
    weight receiving means located on a second side of the balance for receiving said first weight and said second weight; and
    said device being capable of balancing second and third classes of field event implements using singularly and in combination only said first and second weights.

2. The device of claim 1 wherein said first weight is capable of balancing a second class of field event implements when said first weight is positioned at said weight receiving means.

3. The device of claim 1 wherein said first and said second weights are capable of balancing a third class of field event implements when said first and said second weights are positioned at said weight receiving means.

4. The device of claim 1 wherein said implement receiving means includes a cup having a flat upper surface and two slots cut into said flat upper surface, said slots being wide enough to receive a javelin.

5. The device of claim 1 wherein said biasing means includes a weight mounted on said weight receiving means.

6. The device of claim 1 wherein said weight receiving means includes a horizontal bar fixed to the balance, said first and said second weights having holes drilled therethrough to allow said weights to slide onto and be supported by said bar.

7. A balancing system for verifying the weight of field event implements, comprising
    a base;
    a fulcrum mounted to said base;
    a balancing arm assembly pivotally mounted about said fulcrum;
    means located on a first side of said balance arm assembly for receiving field event implements.
    a first weight;
    a second weight, the total weight of said first weight and said second weight being equal to the weight of the lightest class of field event implements with which the system is to be employed;
    biasing means for biasing the balance arm assembly so that a balance is reached with said first and said second weights on said implement receiving means;
    weight receiving means located on a second side of said balance arm assembly for receiving said first and said second weights; and
    said device being capable of balancing a second class and a third class of field event implements using singularly and in combination only said first and second weights.

8. The device of claim 7 wherein said first weight is capable of balancing a second class of field event implements when said first weight is positioned at said weight receiving means.

9. The device of claim 7 wherein said first and said second weights are capable of balancing a third class of field event implements when said first and said second weights are positioned at said weight receiving means.

10. The device of claim 7 wherein said implement receiving means is capable of supporting in stable equilibrium a javelin, a discus and a shot.

11. The device of claim 7 wherein the lightest class of field event implements is for javelins.

12. The system of claim 7 wherein said system may be calibrated to verify the weight of a discus positioned on said implement receiving means by placing said first weight on said weight receiving means.

13. The system of claim 7 wherein said system may be calibrated to verify the weight of a shot located on said implement receiving means by placing said first and said second weights on said weight receiving means.

14. A system for verifying the weight of three classes of field event implements wherein the first class is lighter than the second class and the second class is, in turn, lighter than the third class, comprising
    a base;
    a fulcrum mounted on said base;
    a balancing arm assembly pivotally mounted about said fulcrum;
    means located on a first side of said balance arm assembly for receiving a field event implement;
    a first weight;
    a second weight;
    weight receiving means located on a second side of said balance arm assembly for receiving said first and said second weights;
    the ratio of the effective moment arm distance between said implement receiving means and said fulcrum to the effective moment arm distance between said fulcrum and said weight receiving means being equal to the weight of the first class of field event implements divided by the difference between the weight of the third class of field event implements and the weight of the first class of field event implements;
    said first weight being equal to the ratio of the effective moment arm distances multiplied by the difference in weight between the second class of field event implements and the first class of field event implements; and
    said second weight being equal to the difference of the weight of the first class of field event implements and said first weight.

* * * * *

UNITED STATES PATENT OFFICE
CERTIFICATE OF CORRECTION

Patent No. 3807518                    Dated April 13, 1974

Inventor(s) Gerald E. Meade

It is certified that error appears in the above-identified patent and that said Letters Patent are hereby corrected as shown below:

In the Heading:

change the inventor from "George E. Meade" to --Gerald E. Meade--.

Signed and sealed this 10th day of September 1974.

(SEAL)
Attest:

McCOY M. GIBSON, JR.
Attesting Officer

C. MARSHALL DANN
Commissioner of Patents